Patented Jan. 1, 1935

1,986,050

UNITED STATES PATENT OFFICE 1,986,050

PROCESS OF TREATING RUBBER

Taliaferro J. Fairley, Alexandria, La., assignor, by direct and mesne assignments, of one-half to W. J. Hunter and one-half to Mary P. Hunter, both of Shreveport, La.

No Drawing. Application July 6, 1931, Serial No. 549,118

3 Claims. (Cl. 106—23)

The present invention relates to the treatment of vulcanized rubber to obtain therefrom distillation products useful in the arts, and a residue which will make the process economically successful.

More particularly, the invention pertains to the distillation of vulcanized rubber to obtain a distillate which will possess the properties of a drying oil. By carrying the distillation to dryness, the carbon contained in the rubber will be recovered, and materials present in the manufactured article, such as fibers are carbonized, thereby increasing the yield so that the residue can be utilized to obtain a very satisfactory carbon or carbon black.

In carrying out the invention, the vulcanized rubber is distilled, and the distillate therefrom collected in a suitable condensing apparatus. The distillation is carried on until all of the fractions are recovered, and there remains in the still a carbon residue which will consist of the original carbon and carbon obtained by the burning of any fibers, or other materials which were present in the rubber and were not volatilizable.

In carrying out this dry distillation, the temperatures required will reach about 400° C., depending upon the character of vulcanized or manufactured rubber which is treated. The operation, as will be understood, is a simple distillation treatment of the rubber in any suitable still wherein the volatile products may be carried over and condensed. Thus attention to such things as pressures and catalysts are unnecessary.

It will be understood that in the distillation process, in accordance with this invention, all of the heavy ends are distilled over, leaving the dry carbonaceous residue referred to.

The distillate obtained may be refined in any suitable manner. Thus, I may subject it to further distillation, to improve the color and odor, or in some cases I may treat it chemically with sodium plumbite solution or dilute sulphuric acid. Also, I may wash it after the manner set forth in my copending application, Serial No. 279,379.

I may also carry out my distillation treatment by distilling the vulcanized rubber in the presence of a vacuum, and find that a much lower temperature can be employed. The resultant distillate can be treated in the manner above described for the purpose of refining it, and in this connection where I resort to re-distillation, this may be accomplished under vacuum. Also, the distillate obtained by the dry distillation first referred to, can likewise be refined by redistillation under vacuum.

As a further method of distilling the rubber, I will follow the processes set forth in my pending applications, Serial Nos. 279,603; 297,378; 354,490 and 279,605, to form a rubber solution. The solution so obtained may, if desired, be first screened or filtered to remove any fibers which can subsequently be re-used or such filtering need not be resorted to.

The solution is then distilled, and the solvent is first recovered, whereupon distillation is continued to distill the rubber. This treatment will also preferably be conducted to dryness, so that a carbon residue will remain in the still, as heretofore described. This process of distilling the solution will also be accomplished at a considerably lower temperature than the dry distillation first referred to.

The distillate obtained will then be refined in any of the several ways heretofore referred to, so as to obtain a material having the desired color and free from objectionable odors. In this connection, the distillation of the solution just described, may take place under vacuum, and the refining by re-distillation may likewise be accomplished under vacuum conditions. The distillation under conditions of vacuum will permit a much lower temperature to be employed than where the material is subjected to dry distillation.

I have found that the product obtained by distilling under conditions of vacuum and redistilling under vacuum, is a very excellent product, and in some cases the redistillation is not necessary.

I have, moreover, found that in utilizing the low temperatures possible, that the distillate obtained by the vacuum treatment is very satisfactory.

The distillate obtained by any of the several methods above referred to, is an oily liquid which, as stated, may be refined in several ways. This distillate I find possesses the properties of a drying oil, and is an excellent substitute for linseed oil, drying, in fact, much quicker than is the case with the commercial linseed oil product.

In other words, the distillate will dry or harden on exposure to air in substantially one-third of the time required for linseed oil and in the presence of oxidizing agents or driers, such as the various metal oxides which are usually associated with linseed oil, the drying takes place with great rapidity. Such oxidizing agents may consist of small amounts of the oxides of lead, manganese or cobalt, and by heating the oil with such agents, a so-called "boiled" product or oil is obtained which dries in a very short time. The temperature required to effect oxidation will depend on the particular drier employed.

The distillate may, moreover, be blown with air or oxygen at a temperature of substantially 250° F. for about six (6) hours, when it will be found that the specific gravity has increased from .940 to .998 to obtain an oxidized product, in the form of a heavy very viscous liquid of the consistency of heavy syrup.

The distillate may be polymerized by heating in the presence of nitric acid and water to produce an excellent varnish gum equivalent in all respects to the best copals. Preferably, equal parts of nitric acid and water to make a dilute solution and constituting 10% to 25% by volume of the batch of oil or distillate treated are employed.

The distillate or oil is a solvent for varnish gums, such as copal, kauari, dammar, amber, cumar, as well as other of the natural and synthetic resins which are well known in varnish making. The gum is added to the oil or distillate and by heating an excellent solution is obtained without waste of the gum and the entire solution can then be incorporated in a suitable varnish. In this connection a solution of varnish gum in the distillate of the present invention and in the presence of a suitable thinner, as for instance, turpentine and others well known in the art of varnish manufacture, will produce a very acceptable varnish. Of course, some pigment may be added and other constituents as desired, such as a drier.

The distillate when suitably oxidized by oxidization agents, will produce a film useful for making patent leather, as well as a coating wherever required. This is due to the excellent drying properties of the distillate.

In order to produce a plastic composition in which may be incorporated a suitable filler such as cork dust or wood flour, as for example in the manufacture of linoleum, the distillate is combined with a small quantity of fatty acid, such as oleic, stearic, palmitic, linolic and linolenic, or other fatty acids which are homologues of those mentioned. The mass is heated to promote oxidization and there is added thereto a small amount of an alkali, preferably lime, and the heating continued for a short period. At the end of the heating, the entire mass will be allowed to cool, and in a relatively short time will harden and produce a product much better than the so-called solid oil or cement which is produced from linseed oil. In referring to the use of lime, it is to be understood that other oxides, hydroxides and carbonates of the alkali and alkali earth metals may be utilized. The presence of the alkali has the function of making the solid oil or cement insoluble in water and most acids. It will be understood that a moldable composition may be produced from solid oil or cement just described, and there may be incorporated with the moldable mass any of the usual ingredients which are well known in the art. This plastic or gelatinous mass is useful in making floor cloth, oilcolth and linoleum and in the case of oil cloth, the filler is usually "Spanish" whiting.

The oil or distillate obtained in accordance with this invention finds ready use as a substitute for the more expensive drying oils, of which linseed and Tung oil are very expensive examples.

The distillate or oil obtained in accordance with this invention may be cracked by using an electric resistance coil mounted within a still with which the vapors from the oil come in contact. The light distillate obtained is mixed with hydrochloric acid, and the mass is steam distilled. The steam distilling is carried on to remove the lighter fractions and the residue in the still will consist of a rubber like substance and hydrochloric acid which later is washed out of the mass, and the rubber is left free of acid. In the cracking process, all of the distillate is cracked and the operation is preferably conducted in an inert atmosphere. After the cracked product has been steam distilled, the resultant residue constitutes an excellent synthetic rubber and is apparently a polymerization product.

It will be understood that the lighter fractions of the oil or distillate may be used for producing the synthetic rubber, as by the cracking treatment above referred to, and the heavy ends retained to produce the drying oil. However, all of the distillate may be used to produce the drying oil or all of it may be cracked to produce a synthetic rubber.

As stated, the distillate of this invention will absorb oxygen more readily than linseed oil, and by heating it with any other of the several oxides mentioned, a product superior to boiled linseed oil is obtained, its superiority being based on the fact that it is quicker drying, less inflammable, and forms a more rubber like film.

The composite sample of the distillate or oil recovered by my invention usually has a specific gravity of 0.932 and an end point of substantially 350° C. On account of the free and combined sulphur in the original scrap rubber, an objectionable odor is sometimes present, but by washing with water or refining by any one of the methods above mentioned, the color and order is considerably improved. In fact all objectionable odors are removed, and a most delightfully colored product is usually obtainable by the refining processes described, and in many cases where vacuum treatment is resorted to, subsequent refining is not required.

I claim:

1. An oxidizable or drying oil obtained by distilling vulcanized rubber until a dry residue is obtained and condensing all of the resultant vapors and collecting the same as a single distillate.

2. The process of treating vulcanized rubber which comprises subjecting vulcanized rubber to destructive distillation up to about 400° C., continuing the distillation until a dry residue is obtained, condensing all of the resultant vapors, and collecting the mixture of vapors as a single distillate.

3. The process of treating vulcanized rubber which comprises subjecting vulcanized rubber to destructive distillation, continuing the distillation until a dry residue is obtained, condensing all of the resultant vapors, and collecting the mixture of vapors as a single distillate.

TALIAFERRO J. FAIRLEY.